United States Patent [19]

Chopin et al.

[11] Patent Number: 5,688,439

[45] Date of Patent: Nov. 18, 1997

[54] COLLOIDAL DISPERSIONS OF CERIUM OXIDE CORE/TITANIUM OXIDE SHEATH PARTICULATES AND PHOTOCATALYTIC COATINGS PROVIDED THEREBY

[75] Inventors: Thierry Chopin, Saint-Leu la Foret; Denis Huguenin, Paris; Alain Mathurin, Ouistreham, all of France

[73] Assignee: Rhone-Poulenc Chimie, Courbevoie Cedex, France

[21] Appl. No.: 437,310

[22] Filed: May 9, 1995

[30] Foreign Application Priority Data

May 9, 1994 [FR] France ................... 94 05686

[51] Int. Cl.$^6$ ............... B01J 13/00; B01J 21/06; A61K 7/42; B32B 15/02
[52] U.S. Cl. ............ 252/309; 252/313.1; 252/314; 106/286.4; 428/403; 502/304; 424/59
[58] Field of Search ............... 252/309, 313.1, 252/314; 502/304, 309; 106/286.4; 501/905; 424/59; 428/403

[56] References Cited

U.S. PATENT DOCUMENTS

| | | | |
|---|---|---|---|
| 3,024,199 | 3/1962 | Pasfileld | 252/313.1 |
| 4,799,963 | 1/1989 | Basil et al. | 106/287.13 |
| 5,064,628 | 11/1991 | Chane-Ching et al. | 502/304 |
| 5,232,889 | 8/1993 | Blanchard et al. | 502/304 |
| 5,280,002 | 1/1994 | Bonneau et al. | 502/304 |
| 5,376,305 | 12/1994 | Chane-Ching et al. | 252/313.1 |

FOREIGN PATENT DOCUMENTS

| | | |
|---|---|---|
| 0207857 | 1/1987 | European Pat. Off. |
| 6-048777-A | 2/1994 | Japan |

OTHER PUBLICATIONS

Translation PT096–2878, corresponding to Japan Kokai 6–48777 Apr. 1996.
Patent Abstracts of Japan, vol. 18, No. 276 (C–1204) (May 26, 1994) & JP–A–06 048 777 (Asahi Glass Co.) Feb. 22, 1994.
Database WPI, Derwent Publications Ltd., London, GB; AN 88–319394 & JP–A–63 236 541 (Nissan Motor) (1988).
Patent Abstracts of Japan, vol. 14, No. 211 (C–0715) (May 2, 1990) & JP–A–02 048 418 (Catalysts & Chem. Ind.).

*Primary Examiner*—Richard D. Lovering
*Assistant Examiner*—Daniel S. Metzmaier
*Attorney, Agent, or Firm*—Burns, Doane, Swecker & Mathis, L.L.P.

[57] ABSTRACT

Colloidal dispersions of solid colloidal particulates in a liquid medium, preferably an aqueous medium, said colloidal particulates comprising a core of cerium oxide at least partially coated with a sheathing layer of titanium oxide, are well suited for the photocatalytic coating of a variety of substrates, e.g., glass or metal, to impart anti-IV, anti-reflecting and/or anti-staining properties thereto.

24 Claims, No Drawings

COLLOIDAL DISPERSIONS OF CERIUM OXIDE CORE/TITANIUM OXIDE SHEATH PARTICULATES AND PHOTOCATALYTIC COATINGS PROVIDED THEREBY

BACKGROUND OF THE INVENTION

1. Technical Field of the Invention

The present invention relates to colloidal dispersions based on cerium oxide and titanium oxide, to processes for the preparation of such dispersions and to the use thereof for the coating of substrates, especially to impart anti-UV, anti-reflecting or anti-staining properties thereto.

2. Description of the Prior Art

It is known to this art to be problematical to coat substrates such as glasses and metals. Indeed, various techniques have been carried out to protect these substrates and to impart to them characteristics such as, especially, anti-UV, anti-reflecting and anti-staining properties.

The stains are, for example, greases or organic residues, such as those deposited on a car windshield by exhaust gases, soots, pollution or resulting from the plasticizers present in car passenger compartments.

Consequently, need continues to exist for a coating capable of providing for the photocatalytic degradation of these stains.

It has also been attempted to impart the property of UV-screening to such substrates while conferring good light-transmission properties therein.

It too is known to coat the substrates, to impart such properties thereto, by means of colloidal dispersions which are deposited onto the substrates to be treated.

However, the formulation of such dispersions presents certain difficulties. It is necessary, on the one hand, to provide dispersions which incorporate a number of species capable of simultaneously imparting the maximum of properties to the coating. On the other hand, to be industrially viable, the dispersions must additionally have a satisfactory stability and stability might indeed be difficult to obtain, taking account of the complexity of the composition of the dispersion.

SUMMARY OF THE INVENTION

Accordingly, a major object of the present invention is the provision of improved colloidal dispersions which avoid or conspicuously ameliorate the above disadvantages and drawbacks to date characterizing the state of this art.

Briefly, the present invention features novel colloidal dispersions of colloids which comprise a core of cerium oxide at least partially coated with, or sheathed within a layer of titanium oxide.

The present invention also features a process for the preparation of such colloidal dispersions, wherein a first embodiment thereof, a cerium oxide sol and a titanium salt are intimately admixed and then the temperature of the medium obtained in the first step is increased, optionally in the presence of urea, whereby effecting precipitation of titanium oxide onto the cerium sol colloids.

In a second embodiment, the process for the preparation of a colloidal dispersion according to the invention comprises intimately admixing a cerium oxide sol and a titanium salt, thereafter adding a base to the medium obtained in the preceding stage, whereby effecting precipitation of titanium oxide onto the cerium oxide colloids.

According to a third embodiment, the process for the preparation of a colloidal dispersion according to the invention comprises the following stages:

(a) precipitating a cerium oxide sol by means of a base, (b) mixing the precipitate thus obtained with a titanium salt, whereby a cerium oxide sol is obtained, (c) increasing the temperature of the sol formed, whereby precipitating titanium oxide onto the cerium oxide colloids.

Lastly, according to a fourth embodiment, the process for the preparation of a colloidal dispersion according to the invention comprises the following stages:

(a) precipitating a cerium oxide sol by means of a base, (b) mixing the precipitate thus obtained with a titanium salt, whereby a cerium oxide sol is obtained, (c) adding a base to the sol thus formed, whereby precipitating titanium oxide onto the cerium oxide colloids.

This invention also features the coating of a substrate, wherein a colloidal dispersion as described above is deposited onto appropriate substrate.

Too, this invention features the coated substrates prepared via the above processes.

DETAILED DESCRIPTION OF BEST MODE AND PREFERRED EMBODIMENTS OF THE INVENTION

More particularly according to the present invention, colloidal dispersions are provided, the colloids of which comprise a core of cerium oxide at least partially covered, coated or sheathed within a layer of titanium oxide.

By "colloidal dispersion" is intended any system comprising fine particles of colloidal dimensions, based on cerium oxide and/or hydrated oxide (hydroxide), in suspension in a liquid, especially aqueous, phase. It will be appreciated that the cerium can be present either entirely in the form of colloids or simultaneously in the form of ions and of colloids, without, however, the proportion represented by the ionic form exceeding approximately 10% of the total weight of the cerium in the colloidal dispersion. According to the invention, colloidal dispersions are preferably provided in which the cerium is entirely in the colloidal form.

More precisely, the colloidal dispersions according to the invention are dispersions of cerium(IV) oxide colloids in which the face surface thereof is covered or coated, at least partly, with a titanium oxide precipitate. This titanium oxide can only partly or entirely coat each cerium oxide colloid.

The thickness of the titanium layer is characteristically on the order of 1 to 7 nm.

The titanium oxide precipitated at the surface of the colloids generally exists in the amorphous or weakly crystalline anatase form.

The colloidal dispersions of the invention preferably comprise colloids in which the particle size thereof ranges from 5 to 100 nm and preferably from 5 to 30 nm. The particle size corresponds to the mean diameter of colloids which comprehends the mean hydrodynamic diameter of the latter and as determined by quasi-elastic scattering of light according to the technique described by Michael L. McConnell, in *Analytical Chemistry*, 53, No. 8, 1007 A (1981).

The colloidal dispersions according to the invention typically have a cerium oxide to titanium oxide ratio by weight in the colloids of from 30/70 to 70/30 and preferably close to 50/50.

In another embodiment of the invention, the proportion of solids in suspension in the dispersion preferably ranges from 5% to 50% by weight and more particularly from 5% to 20%.

In a first embodiment, the liquid phase composing the colloidal dispersion is an aqueous phase. The aqueous phase advantageously comprises nitrates, acetates, propionates, chlorides, or ammonium ions.

In a second embodiment, the liquid phase comprising the colloidal dispersions is an organic phase. Such an organic phase colloidal dispersion presents the advantage of being able to reinforce the coatings of the coated substrates by sol-gel processes.

According to this latter embodiment, the organic phase can comprise an organic acid and a liquid organic medium or solvent.

The liquid organic medium is advantageously an inert aliphatic or cycloaliphatic hydrocarbon or mixture thereof such as, for example, mineral or petroleum spirits or mineral or petroleum ethers which can also contain aromatic components and, in particular, hexane, heptane, octane, nonans, decane, cyclohexane, cyclopentane, cycloheptane and liquid naphthenes. Aromatic solvents such as benzene, toluene, ethylbenzene and xylenes are also suitable, as well as petroleum cuts of Solvesso type (registered trademark of Exxon), especially Solvesso 100 which essentially consists of a mixture of methylethyl- and trimethylbenzene and Solvesso 150 which contains a mixture of alkylbenzenes, in particular of dimethylethylbenzene and of tetramethylbenzene. It is also possible to use liquid organic phases based on chlorinated hydrocarbons such as chloro- or dichlorobenzene and chlorotoluene, as well as aliphatic and cycloaliphatic ethers such as diisopropyl ether or dibutyl ether and aliphatic and cycloaliphatic ketones such as methyl isobutyl ketone, diisobutyl ketone or mesityl oxide.

The organic acid is advantageously selected from among aliphatic carboxylic acids, aliphatic sulfonic acids, aliphatic phosphonic acids, alkylarylsulfonic acids and alkylarylphosphonic acids possessing approximately 10 to 40 carbon atoms, whether natural or synthetic. They can be used alone or in admixture with one another. Exemplary thereof are acids of talloil, coconut oil, soybean oil, tallow oil or linseed oil, oleic acid, linoleic acid, stearic acid, isostearic acid, pelargonic acid, capric acid, lauric acid, myristic acid, dodecylbenzenesulfonic acid, 2-ethylhexoic acid, naphthenic acid, hexoic acid, toluenesulfonic acid, toluenephosphonic acid, laurylphosphonic acid, palmitylsulfonic acid or palmitylphosphonic acid.

Advantageously, the subject colloidal dispersions additionally comprise at least one metal serving as a doping agent or dopant for the purpose of reinforcing the photocatalytic activity of the titanium oxide. Thus at least one metal is preferably selected from among palladium, tungsten, platinum or rhodium.

These elements will be present in the colloidal dispersion in the colloid comprising the cerium oxide core coated with titanium oxide or adsorbed at the surface of the titanium oxide and/or of the cerium oxide.

Advantageously, the concentration of metals ranges from 0.001% to 0.1% by weight with respect to the colloid mass.

In one embodiment of the invention, the colloid dispersion has a pH of from 0.5 to 4 and more particularly from 0.5 to 2.5.

In another embodiment, the colloidal dispersion has a pH of from 7 to 9.

Various methods for the preparation of the colloidal dispersions of the invention are applicable.

In a first method, the preparative process comprises a stage in which a cerium oxide sol and a titanium salt are intimately admixed and then a subsequent stage in which the temperature of the medium obtained in the preceding stage if increased, optionally in the presence of urea, whereby precipitation of titanium oxide onto the cerium sol colloids is obtained.

The cerium oxide sols which are suitable according to the invention are prepared via techniques which are well known to this art and which are described in the literature. They can be prepared, in particular, according to the techniques described in FR-A-2,583,735, FR-A-2,583,736, FR-A-2,583,737, FR-A-2,596,380, FR-A-2,596,382, FR-A-2,621,576 and FR-A-2,655,972, each assigned to the assignee hereof and each hereby being expressly incorporated by reference. The liquid phase of these sols can comprise acetate or nitrate ions.

The system formed by the fine particles of colloidal dimensions of cerium oxide in suspension in the liquid phase can, in addition, optionally contain residual amounts of bonded or adsorbed ions, such as nitrates, acetates, propionates or ammonium ions, depending on the processes by which these sols have been obtained.

These sols are generally acid sols.

The size of the cerium oxide particles is preferably less than 100 nm and more preferably less than 20 nm.

With respect to the titanium salt, this is advantageously a nitrate, a chloride or a sulfate. The titanium nitrate is, for example, prepared by precipitation of a titanium chloride by means of a base, such as aqueous ammonia, followed by a washing to remove the chloride ions and by an acid attack on the precipitate with nitric acid.

The titanium sulfate can be obtained via the purification of the black liquors originating from an acid attack on ilmenite with sulfuric acid.

The titanium chloride can be obtained by attack on titanium ores with chlorine. In the event of use of titanium chloride and titanium sulfate, a preneutralization of this salt can be carried out in order to increase its pH.

In a first stage, the cerium oxide sol and the titanium salt are intimately admixed. The titanium salt is generally introduced into the cerium sol. The mixture is permitted to stand for a few minutes in order to attain homogeneity of the soluble titanium species in the cerium sol. The temperature is then increased in order to effect precipitation of titanium oxide at the surface of the colloidal cerium oxide particles. This temperature advantageously ranges from 60° to 100° C. For example, this temperature will be approximately 60° C. in the case of a titanium nitrate, approximately 80° C. in the case of a titanium chloride and approximately 100° C. in the case of a titanium sulfate.

A cerium oxide dispersion is then obtained in which the particles are at least partly covered or sheathed with titanium oxide.

In one embodiment of this first method, it is possible, during the stage of increasing the temperature, to carry out said stage in the presence of urea.

According to a second method, the process for the preparation of the colloidal dispersions according to the invention is characterized in that it comprises a stage in which a cerium oxide sol and a titanium salt are intimately admixed and then a subsequent stage in which a base is added to the medium obtained in the preceding stage, whereby precipitation of titanium oxide onto the cerium oxide colloids is obtained.

The starting cerium sols and the titanium salts used have the same characteristics as those employed in the first preparative technique.

The stage of intimately admixing the cerium sol and the titanium salt is identical to the first stage of the first embodiment. In the second stage, a base is added to effect precipitation of titanium oxide at the surface of the colloidal cerium oxide particles. A cerium oxide dispersion is then obtained in which the particles are at least partly covered or sheathed with titanium oxide.

The base is advantageously selected from among aqueous ammonia or alkali metal or alkaline earth metal hydroxides.

According to a third method, the process for the preparation of the colloidal dispersions according to the invention comprises the following stages:

(a) precipitating a cerium oxide sol by means of a base,
(b) mixing the precipitate thus obtained with a titanium salt, whereby forming a cerium oxide sol, and
(c) increasing the temperature of the sol thus formed, whereby effecting precipitation of titanium oxide onto the cerium oxide colloids.

The starting cerium sol has the same characteristics as the cerium sol employed in the preceding methods of preparation. It is precipitated during the first stage by contacting same with a base. This base is advantageously, for example, aqueous ammonia or alkali metal or alkaline earth metal hydroxides. Such precipitation results in the formation of a cerium oxide or hydroxide cake, which is filtered.

The cake is then redispersed in a solution of a titanium salt, such as those described above in the preceding preparative techniques, and the cerium oxide peptises in the form of a colloidal dispersion.

Lastly, the temperature is increased as in the first process and under the same conditions, whereby titanium oxide precipitates onto the surface of the cerium oxide colloids.

According to a fourth method, the process for the preparation of a colloidal dispersion according to the invention is characterized in that it comprises the following stages:

(a) precipitating a cerium oxide sol by means of a base,
(b) mixing the precipitate thus obtained with a titanium salt, whereby forming a cerium oxide sol, and
(c) adding a base to the sol thus formed, whereby effecting precipitation of titanium oxide onto the cerium oxide colloids.

The first two stages are carried out in the same manner as in the third embodiment.

As regards precipitation of titanium oxide onto the surface of the cerium colloids, it is, on the other hand, effected via addition of a base.

This base is advantageously aqueous ammonia or alkali metal or alkaline earth metal hydroxides.

In a variation of the above embodiments, colloidal dispersions of cerium oxide and of titanium oxide are prepared comprising, in addition, a metal dopant as described above.

This metal can be introduced in various stages of the embodiments described earlier.

Thus, the metal can be added to the cerium oxide sol in the beginning stage, in case of the four embodiments.

It can also be added during the stage of intimately admixing the cerium oxide sol with the titanium salt, according to the first two methods.

It can also be added to the precipitate formed after precipitation of the cerium sol, according to the third and fourth methods.

Still according to these latter two methods, it can be added to the mixture of said precipitate and the titanium salt.

Lastly, it can be added to the colloidal dispersion obtained after precipitation of titanium oxide onto the cerium oxide, according to the four methods.

The metal doping agent(s) can be introduced in the form of salts and, more particularly, in the form of nitrates or chlorides thereof.

The dispersions of the invention can have a wide acidic or basic pH range. This range can be provided in the following manner. The processes described above are employed and an additional stage is added in which the colloidal dispersion obtained after precipitation of titanium oxide onto the cerium oxide and optional addition of metals is flocculated, the flocculate being washed and dispersed with stirring in an aqueous phase of the desired pH.

To provide a colloidal dispersion in the organic phase from a colloidal dispersion in the aqueous phase according to the invention, any known technique is carried out for the preparation of a colloidal dispersion in the organic phase from a colloidal dispersion in the aqueous phase.

The technique described in FR-A-2,583,761, assigned to the assignee hereof, is particularly applicable.

According to this technique, a colloidal dispersion in the organic phase is prepared from a colloidal dispersion in the aqueous phase obtained according to one of the above methods, after precipitation of titanium oxide onto the cerium oxide colloids, by contacting the aqueous colloidal dispersion with an organic phase comprising an organic acid and a liquid organic medium or solvent and thereafter separating the aqueous phase from the organic phase.

The liquid organic medium and the organic acid have the properties and characteristics described above.

Moreover, the present invention also features a process for the coating of substrates, especially to provide anti-reflecting, anti-UV and anti-stain coatings. This consists essentially in depositing, directly onto said substrates, a colloidal dispersion as described above.

The titanium oxide, by its photocatalytic activity, imparts anti-stain properties to the coating.

This invention is very particularly applicable for the treatment of metal or glass substrates used in the automotive industry or in the construction industry. The state of the substrate before treatment does not require any specific operation, other than conventional cleaning and degreasing treatments.

The deposition of the dispersion can be carried out directly from the colloidal dispersions of the invention using conventional coating techniques of the immersion, spraying, vacuum evaporation or sol-gel type, for example.

The deposition is preferably onto a hot substrate.

The substrate is then thermally treated to remove the various species present, such as water or organic compounds.

There is thus formed, after removal of the liquid phase, a substrate which is coated uniformly discontinuously and homogeneously with particles comprising a core of cerium oxide at least partly covered or sheathed with titanium oxide.

Too, the invention also features cosmetic compositions comprising a colloidal dispersion as described above having, especially, anti-UV properties.

In order to further illustrate the present invention and the advantages thereof, the following specific examples are given, it being understood that same are intended only as illustrative and in nowise limitative.

EXAMPLE 1

(1) Preparation of the cerium sol

A cerium(IV) sol was prepared according to the process described in FR-A-2,583,736, from an aqueous ceric nitrate solution obtained via the electrolytic oxidation of a cerous nitrate solution, as described in FR-A-2,570,087. This ceric nitrate solution was contacted with aqueous ammonia to provide a colloidal Ce(IV) dispersion which was then precipitated by heat treatment. The precipitate was filtered and redispersed in distilled water.

The sol obtained had the following characteristics:
(a) concentration of colloids: 50 g/l
(b) mean particle size of the colloids : 5 nm
(c) pH=1.

This cerium oxide sol was maintained stirred at room temperature.

(2) Preparation of the titanium salt:

A titanium nitrate aqueous solution was prepared at a concentration of 100 g/l.

(3) Preparation of the colloidal dispersion:

200 ml of the titanium nitrate solution were poured slowly and while cold into 0.5 l of the cerium sol. This medium was permitted to stand for 5 min to attain homogeneity of the soluble titanium species in the cerium sol.

The temperature was then very slowly increased, at a rate on the order of 1° C./min, until the temperature of 60° C. was attained. This temperature was maintained for one hour to obtain a titanium oxide precipitation yield of 95%.

The colloidal dispersion was cooled to room temperature. The pH was 0.5.

It was observed, by quasi-elastic light scattering, that the mean particle size of the cerium oxide colloids onto which titanium oxide had precipitated was 12 nm.

EXAMPLE 2

(1) Preparation of the cerium sol:

A cerium sol was prepared according to the process described in Example 1.

(2) Precipitation of the cerium sol:

The cerium sol obtained was precipitated by addition of a sufficient amount of aqueous ammonia.

A cerium oxide cake was obtained with pH=5.5.

(3) Preparation of the colloidal dispersion:

The cerium oxide precipitate was redispersed in 0.5 l of a titanium nitrate solution identical to that used in Example 1 and peptises in the sol form.

The temperature of the sol obtained was then very slowly increased, at a rate on the order of 1° C./min, until the temperature of 60° C. was attained. This temperature was maintained for one hour to obtain a titanium oxide precipitation yield of 95%.

The colloidal dispersion was cooled to room temperature. The pH was 2.

The mean particle size of the cerium oxide colloids onto which titanium dioxide had precipitated was measured, by quasi-elastic light scattering, as 12 nm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A colloidal dispersion comprising solid colloidal particulates in a liquid medium, said colloidal particulates consisting of a core consisting of cerium oxide, said core being at least partially coated with a sheathing layer consisting of titanium oxide.

2. The colloidal dispersion as defined by claim 1, said colloidal particulates having a particle size ranging from 5 to 100 nm.

3. The colloidal dispersion as defined by claim 2, said colloidal particulates having a particle size ranging from 5 to 30 nm.

4. The colloidal dispersion as defined by claim 1, the cerium oxide to titanium oxide ratio by weight in said colloidal particulates ranging from 30/70 to 70/30.

5. The colloidal dispersion as defined by claim 1, the amount of solids dispersed in said liquid medium ranging from 5% to 50% by weight thereof.

6. The colloidal dispersion as defined by claim 5, the amount of solids dispersed in said liquid medium ranging from 5% to 20% by weight thereof.

7. The colloidal dispersion as defined by claim 1, said liquid medium comprising an aqueous phase.

8. The colloidal dispersion as defined by claim 7, said aqueous phase comprising nitrate, acetate, propionate, chloride or ammonium ions.

9. The colloidal dispersion as defined by claim 1, said liquid medium comprising an organic phase.

10. The colloidal dispersion as defined by claim 1, said liquid medium comprising up to 10% by weight of ionic cerium values, based on the total weight of cerium therein.

11. The colloidal dispersion as defined by claim 1, said sheathing layer of titanium oxide having a thickness ranging from 1 to 7 nm.

12. The colloidal dispersion as defined by claim 9, said organic phase comprising an organic acid.

13. The colloidal dispersion as defined by claim 12, said organic phase also comprising an organic liquid.

14. A colloidal dispersion of solid colloidal particulates in a liquid medium, said colloidal particulates comprising a core consisting of cerium oxide and a dopant amount of palladium, tungsten, platinum or rhodium metal values, said core being at least partially coated with a sheathing layer of titanium oxide.

15. The colloidal dispersion as defined by claim 14, the concentration of such metal values therein ranging from 0.001% to 0.1% by weight thereof.

16. The colloidal dispersion as defined by claim 1, having a pH ranging from 0.5 to 4.

17. The colloidal dispersion as defined by claim 1, having a pH ranging from 7 to 9.

18. The colloidal dispersion as defined by claim 1, said titanium oxide sheathing layer consisting of an amorphous or poorly crystalline anatase titanium dioxide.

19. A process for the preparation of the colloidal dispersion as defined by claim 1, comprising intimately admixing a cerium oxide sol with a titanium salt, and thence adding a base to the medium of admixture, thereby precipitating said sheathing layer of titanium oxide onto core colloidal particulates of cerium oxide.

20. A process for the preparation of the colloidal dispersion as defined by claim 1, comprising intimately admixing a cerium oxide sol with a titanium salt, and thence heating the medium of admixture, optionally in the presence of urea, thereby precipitating said sheathing layer of titanium oxide onto core colloidal particulates of cerium oxide.

21. A process for the preparation of the colloidal dispersion as defined by claim 1, comprising precipitating a cerium oxide sol by adding an effective amount of a base thereto, intimately admixing the precipitate thus obtained with a titanium salt, thereby forming another cerium oxide sol, and thence heating the sol thus formed, thereby precipitating said sheathing layer of titanium oxide onto core colloidal particulates of cerium oxide.

22. A process for the preparation of the colloidal dispersion as defined by claim 1, comprising precipitating a cerium oxide sol by adding an effective amount of a base thereto, intimately admixing the precipitate thus obtained with a titanium salt, thereby forming another cerium oxide sol, and thence adding a base to the sol thus formed, thereby precipitating said sheathing layer of titanium oxide onto core colloidal particulates of cerium oxide.

23. A cosmetic composition comprising a colloidal dispersion of solid colloidal particulates in a liquid medium, said colloidal particulates consisting of a core consisting of cerium oxide, said core being at least partially coated with a sheathing layer consisting of titanium oxide.

24. Colloidal particulates consisting of a core consisting of cerium oxide at least partially coated with a sheathing layer consisting of titanium oxide.

* * * * *